May 26, 1953  S. LEVY  2,640,144
INDICATOR ILLUMINATING DEVICE
Filed Feb. 1, 1950

INVENTOR
SIDNEY LEVY
BY
HIS ATTORNEYS

Patented May 26, 1953

2,640,144

UNITED STATES PATENT OFFICE 2,640,144

INDICATOR ILLUMINATING DEVICE

Sidney Levy, Dayton, Ohio, assignor to The National Cash Register Company, Dayton, Ohio, a corporation of Maryland Application February 1, 1950, Serial No. 141,717

2 Claims. (Cl. 240—2.1)

This invention relates to an indicator illuminating device and more particularly pertains to such devices for use in a cash register or accounting machine having data-indicating devices located within a cabinet behind suitable cabinet apertures through which they are viewed. Such cabinet apertures ordinarily are covered by a transparent closure or window formed by a sheet of glass or plastic material to keep out dirt and to protect the indicating devices from damage or manipulation.

It is an object of this invention to provide a combined light guide and window, for such a cabinet, which to an observer from without the cabinet appears as an ordinary transparent window but which has light-emitting portions adjacent the inside of the apertures and has light-transmitting portions extending therefrom toward a source of light within the cabinet whereby light is transmitted to and projected on the indicating devices. Internally reflecting but transparent material, such as methyl methacrylate resin, for example, is used for the light guide.

In this device, it is one of the inventive objects that the very part of the window through which an observer looks, and which is transparent, is at the same time transmitting light from a light source to one of the portions of the guide which emit the light and which are concealed behind the cabinet above and below the apertures.

With these and incidental objects in view, the invention includes certain novel features of construction and combinations of parts, a preferred form or embodiment of which is hereinafter described with reference to the drawing which accompanies and forms a part of this specification.

In order to explain the invention, it will be described as applied to illuminate a cash register indicating device.

Figure 1:
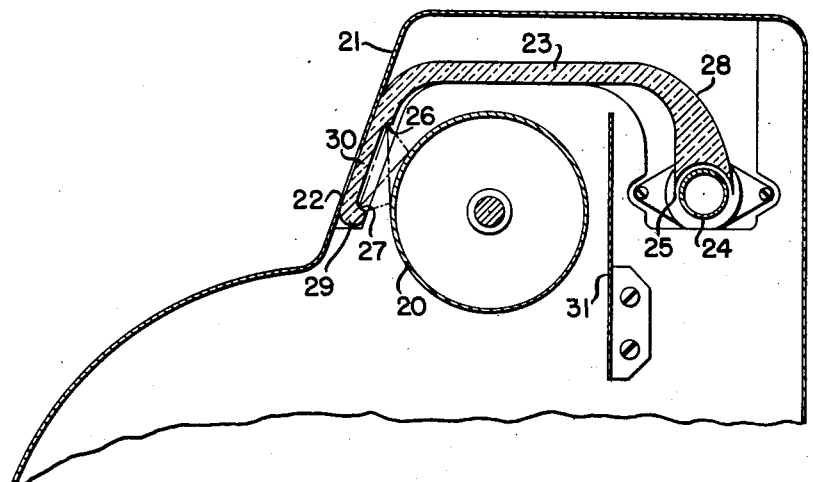
Fig. 1 is a sectional view showing a portion of a cabinet and including an indicating device, a light source, and the combined light guide and window.

The data-indicating devices are shown in the form of conventional indicating wheels 20, one of which is shown in Fig. 1, having the numerals "0" and "1" to "9" about their periphery, which wheels are located within the usual cash register cabinet, a portion of which is shown at 21, and can be rotated by any suitable means to bring any desired numerals into position to be read through apertures, as 22, in the cabinet.

The novel light guide 23 (Figs. 1 and 3) is made of transparent, internally reflecting material, one such material which is suitable being methyl methacrylate resin, and is mounted in the cabinet 21 adjacent the indicating wheels 20 to transmit light from a light source 24 to the wheels to illuminate the numerals which are in reading position.

The light guide 23 is formed with a light-collecting surface 25 and a pair of light-emitting surfaces 26 and 27, the surfaces being so arranged that, when the guide is mounted in the cabinet, the light-collecting surface 25 will be adjacent the light source 24 and the light-emitting surfaces 26 and 27 will be located above and below the apertures and will be so directed as to cause the emitted light to fall on the wheels to illuminate the numerals which are in reading position. The light guide is so shaped as to collect and transmit the maximum amount of light from the light source. In the form shown, for example, the rear surface 28 is in the shape of an elliptical cylinder having one line of focus through the center of the light source and having the other line of focus through the center line of the upper horizontal portion of the light guide. The light-emitting surfaces 26 and 27 are formed as concave cylindrical lens surfaces, which spread the light to cover the desired area of the indicating devices more uniformly. The surface 29 of the light guide is cylindrical to guide the light upwardly through the surface 27.

Heretofore, it has been customary to provide the apertures, through which the indicating devices could be read, with transparent closures or windows to prevent dirt from getting into the machine and to protect the indicating devices from damage or manipulation. The closures as heretofore used are not required in a cabinet in which the novel light guide is used, because the guide itself engages the inside of the cabinet adjacent the apertures and is formed with a sheet-like portion 30, which not only transmits light to the surface 27 but, being transparent, serves as the closure or window through which the numerals can be read.

A light shield 31 (Fig. 1) is mounted in the cabinet between the light source 24 and the indicator wheels 20 to prevent any light, except that through the light guide 23, from reaching the wheels.

Figure 2:
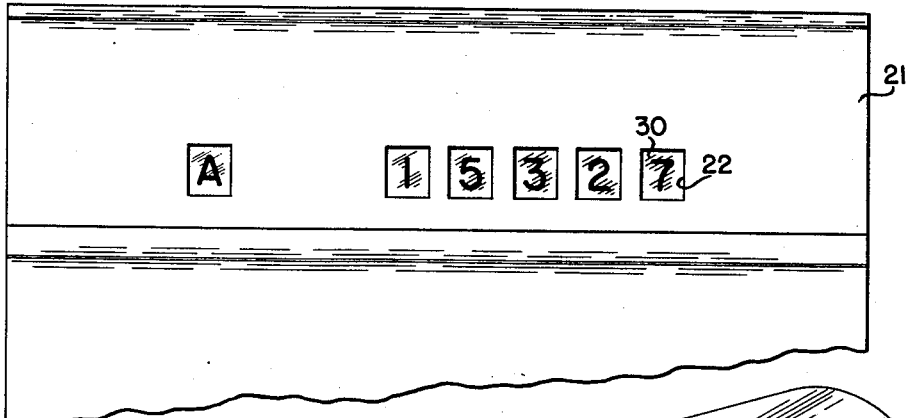
Fig. 2 is a front elevation of a portion of a cabinet showing the indicating devices viewable through apertures therein.
Figure 3:
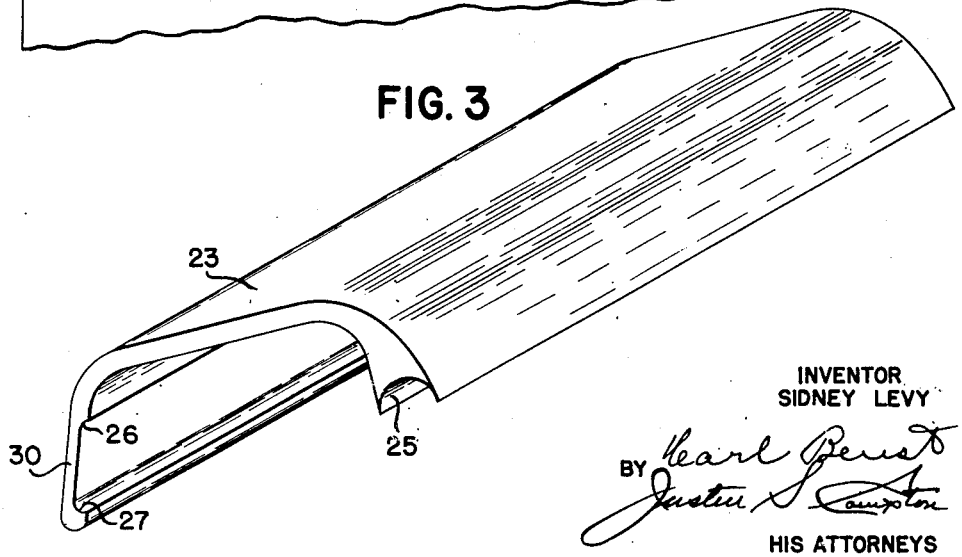
Fig. 3 is a perspective view of the combined light guide and window.

As shown in Figs. 2 and 3, the light guide 23 is wide enough to extend across a plurality of indicating wheels, and the cabinet is provided with a separate aperture, as 22, for each wheel. In those types of cash registers and accounting machines in which a single aperture in the cabinet extends across a plurality of indicating devices, suitable opaque dividing portions can be marked on the surface of the light guide to separate the various indicating devices.

While the light guide 23 is shown as being wide enough to serve for several indicating devices, it is within the scope of the invention to provide an individual light guide for each indicating device, if desired.

From the above it is clear that the novel light guide not only causes light to be directed to the reading point of the indicating devices but also serves as the closure for the aperture through which the indicating devices are read; the very part of the guide through which an observer looks, and which is transparent, is also conducting light from a light source to a surface which directs the light onto the indicating device.

While the device shown and described herein is admirably adapted to fulfill the objects primarily stated, it is to be understood that it is not intended to confine the invention to the one form or embodiment herein disclosed, for it is susceptible of embodiment in various other forms.

What is claimed is:

1. A device for illuminating data-indicating devices situated in a cabinet behind a viewing aperture, including, in combination, a transparent unitary light guide made of material which internally reflects light and having a light collecting surface and a sheet portion extending between the indicating devices and the viewing aperture, said sheet portion having a light directing and emitting edge above the aperture and a light directing and emitting edge below the aperture, each emitting edge directing light toward the indicator, and the intermediate portion of the sheet between said emitting edges being transparent and serving as a closure and as a window whereby an observer may view the indicating devices and a light source positioned adjacent the light collecting surface of the light guide so light is radiated thereinto.

2. The device of claim 1 in which the emitting edges extend horizontally above and below the viewing point of the indicating devices.

SIDNEY LEVY.

References Cited in the file of this patent

UNITED STATES PATENTS

| Number | Name | Date |
|---|---|---|
| 1,973,728 | Salzgeber | Sept. 18, 1934 |
| 2,221,152 | Rylsky | Nov. 12, 1940 |
| 2,490,370 | Neuwirth | Dec. 6, 1949 |

FOREIGN PATENTS

| Number | Country | Date |
|---|---|---|
| 816,795 | France | May 10, 1937 |

OTHER REFERENCES

Ser. No. 375,429, Weber (A. P. C.), published May 25, 1943.